Jan. 6, 1942.  C. A. RAFFERTY  2,268,847
TEMPERATURE COMPENSATOR FOR PRESSURE ACTUATED INDICATORS
Filed March 7, 1940   2 Sheets-Sheet 1
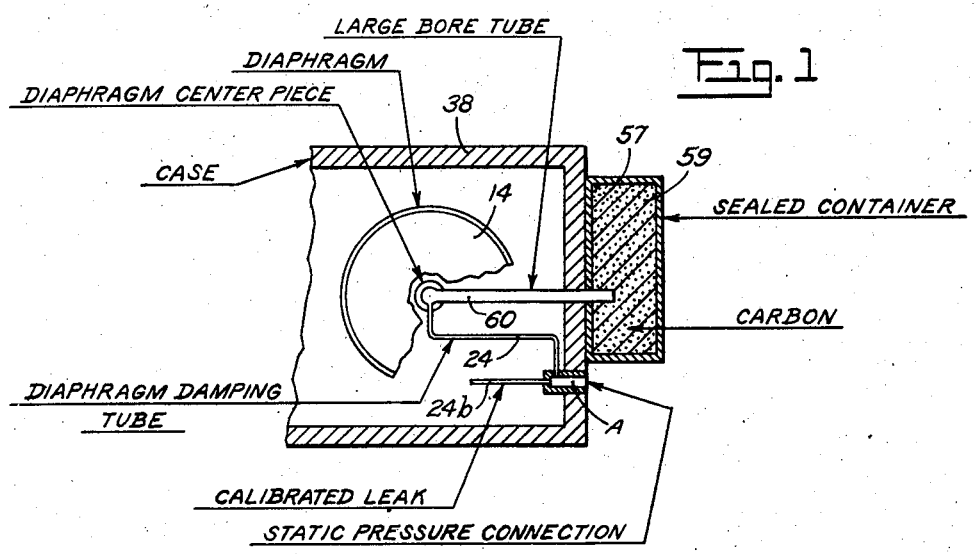
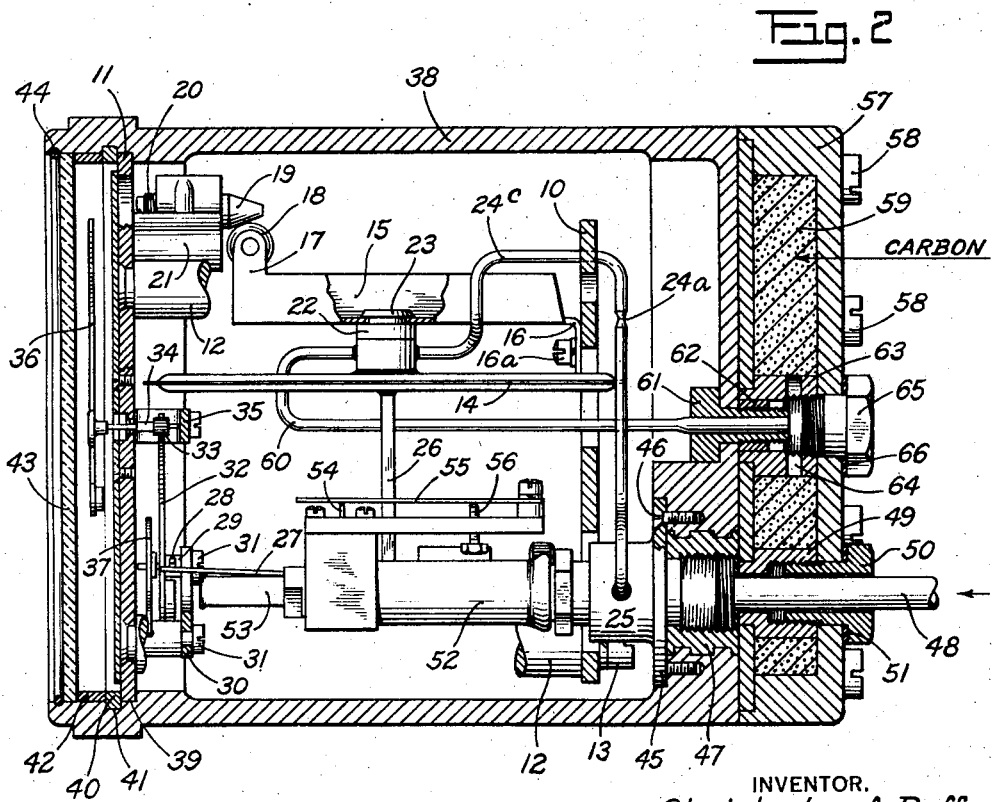
INVENTOR.
Christopher A. Rafferty
BY
Cerstvik & Kalman
ATTORNEYS.

INVENTOR.
Christopher A. Rafferty

Patented Jan. 6, 1942

2,268,847

UNITED STATES PATENT OFFICE 2,268,847

TEMPERATURE COMPENSATOR FOR PRESSURE ACTUATED INDICATORS

Christopher Alois Rafferty, Brooklyn, N. Y., assignor to Bendix Aviation Corporation, Bendix, N. J., a corporation of Delaware Application March 7, 1940, Serial No. 322,852

20 Claims. (Cl. 73—179)

The present invention relates to pressure responsive indicating instruments and more particularly to instruments of the type wherein a differential between the pressures on two sides of a pressure responsive element, established by a change in one of said pressures, is utilized to operate an indicator, and wherein means are provided for the equalization of said pressures when the pressure change no longer takes place.

A rate of climb indicator, for example, constitutes such an instrument, and the invention is illustrated and described hereinafter in connection with such an instrument, but it will be understood, however, that it is not restricted to this particular use and may be embodied in aneroid altimeters, manifold pressure gauges, air-speed indicators and the like.

Similar devices of the prior art have been utilized wherein, due to changes in temperature, undesirable changes in the pressure differential have been produced, thereby rendering an inaccurate indication of the true pressure differential. It has been the practice heretofore to provide such devices of the prior art with temperature responsive compensating means to eliminate or counteract the undesirable pressure changes due to the temperature changes. Nevertheless, even with the provision of such temperature responsive compensators, the devices are either partly or completely inapplicable to the solution of the difficulty resulting from sudden changes in temperature. In other words, the prior art devices are still subject to error due to undesirable pressure changes produced by the rate of change of temperature.

The problem of rate of change of temperature compensation has been solved to some extent, but not completely, by the use of bi-metal strips arranged to respond to the rate of change of temperature in the manner disclosed in the co-pending application of Alfred E. Sidwell, Serial No. 216,580, filed June 29, 1938.

Therefore, one of the objects of the present invention is to provide novel temperature compensating means whereby the error in the pressure differential arising from sudden temperature changes will be practically completely eliminated.

Another object of the invention is to provide novel compensating means wherein the compensating effect is produced by a rate of change of temperature which the instrument undergoes.

A further object is to provide a novel method of temperature compensation whereby errors due to sudden temperature changes are compensated for by the utilization of the adsorption characteristics of a substance when the latter is subjected to varying temperature conditions.

Still another object of the invention is to provide a novel instrument of the type characterized above in which a temperature change sensitive means will act to counteract the change in pressure differential due to sudden temperature changes which the instrument undergoes.

A still further object is to provide a novel instrument of the pressure responsive type which requires substantially no insulation against changes in temperature.

Still another object of the invention is to provide a novel rate of climb indicator of dependable performance which will be accurate under all changes and rates of change in temperature.

The above and further objects and advantages of the invention will appear more fully hereinafter from a consideration of the detailed description which follows, taken together with the accompanying drawings wherein two embodiments of the invention are illustrated. It is to be expressly understood, however, that the drawings are for purposes of illustration and description only and are not designed as a definition of the limits of the invention, reference being primarily had for this purpose to the appended claims.

In the drawings, wherein like reference characters refer to like parts throughout the several views:

Figure 1 is a fragmentary plan view of one form of pressure responsive instrument, illustrating the disposition of the pressure responsive element in relation to the novel compensating means of the invention;

Figure 2 is a side elevation, partly in section, of the operating mechanism and casing of one embodiment of the present invention;

Figure 3:
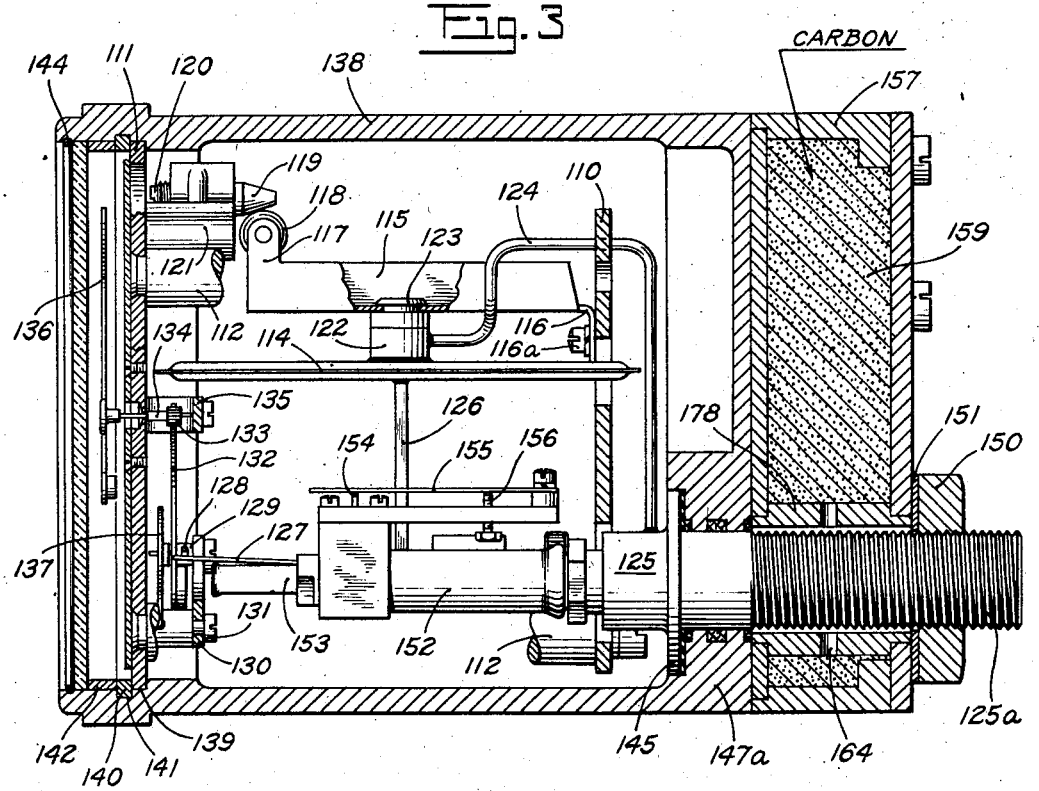
Figure 3 is a view similar to that of Figure 2 illustrating another embodiment of the invention.

It is well known that the specific gravity of gases increases with a decreasing temperature and decreases with an increasing temperature condition so that the molecular velocity of the gas decreases under the former temperature change and increases with a temperature rise. Certain substances, for example, such as carbon, have the property of adsorbing gases when they are subjected to a decreasing temperature and will liberate the adsorbed gases with an increasing temperature. The foregoing phenomena is utilized in the present invention to compensate for the error in pressure differential arising from sudden temperature changes.

For a specific application of the use of the above mentioned property of gases reference is now made to the illustration of Figure 1 wherein is disclosed the general application of the novel compensating means of the invention. A diaphragm 14 is mounted within the casing 38 and arranged for direct communication with the outside atmosphere by way of conduit 24 and a static pressure connection A. In the present embodiment (Fig. 1), the conduit 24 has a relatively small internal diameter and functions as a damping tube and permits a compensating pressure to develop in the interior of diaphragm 14 as will appear more fully hereinafter. The interior of the casing 38 communicates with the outside atmosphere by way of a calibrated leak 24b so that some time must elapse before the pressure within the casing will equalize with the outside pressure. In other words, the flow retarding effect of the calibrated leak 24b is much greater than that of the damping tube 24.

When the casing is subjected to a sudden temperature drop, for example, the pressure within the casing 38 will decrease and remain so for a period of time due to its restricted communication with the atmosphere. A pressure drop may also exist within the diaphragm 14. However, it will be almost immediately counteracted by the inrushing air from the outside atmosphere through the conduit 24. It is apparent, therefore, that this inequality in pressures within the casing and the diaphragm respectively, will produce an indication of pressure change which would indicate descent.

Secured to the casing 38 is a chamber or sealed container 57 provided with powdered carbon 59 having its interior in communication with the interior of the diaphragm 14 by way of the large bore tube or conduit 60. At the instant that the casing 38 is subjected to the sudden temperature drop the chamber 57 is likewise subjected to this drop and the carbon disposed therein acquires the property of adsorption of gases. Since the chamber 57 is in direct communication with the interior of the diaphragm only, the gases adsorbed will be a portion of those present within the diaphragm and the pressure within the diaphragm will be reduced and equalized to conform with the pressures within the casing 38. This is due to the fact that conduit 60 is of larger bore than conduit 24 and, therefore, the air flows more readily between the diaphragm 14 and chamber 57 than between the diaphragm and the exterior of the casing 38, thereby permitting a compensating pressure to develop inside of the diaphragm 14 when sudden and rapid changes take place. As previously stated, however, the flow retarding effect of the calibrated leak 24b is much greater than that of the conduit 24.

The converse of the above is likewise true when the instrument is subjected to a sudden temperature rise. Thus, when the temperature is suddenly increased, the pressure in the casing increases and tends to compress the diaphragm, while the pressure inside the diaphragm remains substantially unchanged since the diaphragm is in communication with the outside atmosphere by way of damping tube 24. The resulting compression or contraction of the diaphragm has the same effect as a reduction of pressure in the diaphragm due to change in altitude and, therefore, the instrument would tend to indicate a climb when no climb is taking place. This error is compensated, however, because the chamber 57 is also subjected to the sudden increase in temperature which heats the carbon and causes it to liberate the air it had adsorbed at lower temperatures. The liberated air immediately passes to the inside of the diaphragm 14 through conduit 60, thereby increasing the pressure in the diaphragm and causing it to equalize with the pressure in the casing and preventing contraction of the diaphragm even though the temperature increased.

Referring now to Figure 2, the foregoing principle is shown applied, in accordance with the present invention, to a rate of climb indicator having its operating mechanism mounted within any suitable casing on a frame of any suitable type and construction which, as shown, comprises a rear frame member or plate 10 and a face plate 11, said plates being held in spaced relation in any suitable manner as by spacers 12 and screws 13. Mounted in the frame is a pressure responsive element or diaphragm 14 of any suitable type that is adapted to operate any suitable indicator or pointer when a pressure differential is established between the pressure inside the element and the pressure surrounding the element within the casing. This may be accomplished as, for example, by providing for communication between the inside of the diaphragm and the atmosphere outside of the casing of the instrument, while interposing diffusing means between said outside atmosphere and the inside of the casing in which the diaphragm is mounted.

The pressure responsive element 14 is mounted in any suitable manner on a channeled arm 15 which is carried by a flexible bracket 16, formed integrally therewith if desired, which bracket is secured to rear plate 10 by suitable means such as screws 16a.

To provide for zero adjustment of the instrument, the free end of arm 15 is provided with an upwardly extending portion 17 carrying a roller 18 so as to engage in frictionless contact the coned end 19 of a set screw 20 carried by a member 21 formed on one of the spacers 12. The diaphragm 14 may be supported by means of a central boss 22 that is secured to the arm 15 by any suitable means such as a grommet 23, said boss being hollow and connected to a tube 24c, having a restricted portion 24a, and communicating with a coupling chamber 25 that is suitably vented to the outside atmosphere through the casing of the instrument.

Suitable actuating connections are provided between the diaphragm 14 and the indicator of the instrument. As shown, for example, in the drawings such mechanism may constitute a link 26 mounted on the diaphragm for reciprocating action in accordance with the contraction or expansion of the latter. The movement of link 26 may be transferred in any suitable manner to an arm 27 which is adapted to engage a finger 28 carried by a spindle 29 journalled in a plate 30 secured to the plate 11 by suitable means such as a screw 31. The spindle 29 is further provided with a counter-weighted gear sector 32 adapted to mesh with a pinion 33 splined to a spindle shaft 34 journalled in a bracket 35 at one end and carrying an indicator or pointer 36 at its other end as shown in Figures 2 and 3.

The finger 28 carried by the spindle 29 is engaged by the end of arm 27 for rotation thereby in one direction, and a suitable hair-spring 37 tends to rotate the spindle 29 in the opposite direction whereby expansion and contraction of the diaphragm 14 is converted into rotation of the spindle 29 and gear sector 32 in one or the other direction and consequent operation of the indicator 36 through pinion 33.

The mechanism above described is mounted in an instrument casing 38 being constructed so as to provide a substantially sealed chamber enclosing the diaphragm 14 which communicates with the atmosphere outside the casing through the conduit 24c and coupling chamber 25. As shown in Figures 2 and 3, the complete mechanism is enclosed within the casing 38. The face plate 11 is seated against a shoulder 39 formed in the casing and held therein by a split ring 40 which engages the underside of a shoulder 41 also formed in the casing. The open end of the casing 38 is suitably closed as by means of a split spacing ring 42 and a cover glass 43 held in place by a suitable split ring 44.

The coupling member 25 is provided with a flange 45 secured by suitable means such as screws 46 to the casing 38 and forming a seal-tight fit for the interior of the casing with an interiorly threaded bushing 47. A conduit 48 is provided with an enlarged threaded portion received by the interiorly threaded bushing 47 and permits communication of the atmosphere to the coupling member 25 and passes through a second threaded bushing 49 provided with a lock-nut 50 having a gasket 51 insuring an air-tight seal for the casing.

Communication is provided between the interior of the diaphragm 14 and the atmosphere outside the casing of the instrument, while diffusing means of the type disclosed in the issued patent to James E. Bevins, No. 2,147,962, dated February 21, 1939, are interposed between the outside atmosphere and the inside of the casing.

Diffusing means of the type described in the above patent, for example, provide means whereby equalization of the pressure inside and outside of the diaphragm 14 may be properly regulated. In the present embodiment, said means comprise a hollow member 52 suitably connected to coupling member 25 by an air-tight connection. Suitable diffusing elements are provided for closing the ends of the hollow member 52. One of said elements, which is shown as a hollow porcelain tube 53 closed at one end and connected to the hollow member 52 at the other end, closes the right hand hollow member 52 and controls the diffusion of the air between the inside of the instrument casing and the interior of the hollow member 52, while a second similar porcelain member (not shown) is located within the hollow member 52 and controls the diffusion of air between the interior of said hollow member and the outside atmosphere by means of coupling member 25 and conduit 48. The hollow member 52 is also provided with an outlet in which is disposed a temperature controlled by-pass valve, the stem 54 of which is controlled in its position by the temperature responsive element 55 adjustably positioned by screw 56. It is to be noted that the element 55 is responsive to the amount of temperature change and is not actuated in response to the rate of said temperature change. The details of said diffusing means do not constitute a part of the present invention and are fully disclosed in the above mentioned patent to Bevins to which reference is hereby made for details of the construction thereof.

The novel temperature compensating means of the present invention are now provided, and for this purpose a chamber 57 is rigidly secured, for example, to the rear portion of the casing 38 by any suitable means such as screws 58, and the interior of the chamber is provided with a predetermined amount of powdered carbon designated generally at 59. The quantity of carbon to be used depends upon the size of the instrument and the practical limits of rate of temperature change required.

A conduit 60 leading from the interior of the diaphragm 14 connects with the inside of the chamber 57 by way of a threaded fitting 61 passing through the rear portion of the casing 38 and resting within the bushing 62. The latter bushing rests within a larger bushing 63 provided with a transverse annular channel 64 and is held in place by means of a lock nut 65 in threaded engagement with the interior of the bushing 63 and a suitable gasket 66 provides a seal-tight fit between the nut 65 and the chamber 57. In this embodiment (Fig. 2) the conduits 24c and 60 are of substantially the same internal diameter and, therefore, in order to produce a damping action on the diaphragm 14 and to permit a compensating pressure to develop in the interior of the diaphragm a constriction 24a is provided in the conduit 24c. This constriction then has the same effect as the damping tube 24 of Fig. 1.

Referring now to the operation of the instrument, with an increase in altitude, the atmospheric pressure surrounding the instrument decreases in proportion to the rate of change in altitude or the rate of climb and the pressure within diaphragm 14 decreases correspondingly since the latter is in substantially open communication with the outside atmosphere. The pressure within the casing 38, however, cannot instantly equalize with the outside atmospheric pressure as the gases within the casing must escape by means of the diffusing means including porcelain tube 53. The pressure within casing 38, therefore, remains greater than the pressure within diaphragm 14 so that the latter is compressed to actuate the pointer 36 to indicate the rate of climb. If the increase in altitude is stopped and the instrument remains at a constant altitude, then the gases within casing 38 will escape through the diffusing means until the pressures within the casing and within the diaphragm 14 are equal.

Whenever a pressure differential is caused between the pressure inside of the casing 38 and the pressure of diaphragm 14, a certain period of time must elapse before the pressure can be equalized even though the atmospheric pressure remains constant.

If we assume, for example, that an instrument of the character described, is mounted on an aircraft which is located in a heated hangar and then taken into a cold atmosphere, the sudden change of temperature inside of the casing will cause a reduction of the pressure of the gas within the casing. While the pressure inside of the diaphragm is likewise momentarily reduced, the interior of the diaphragm being connected substantially directly to the atmosphere, a flow of air will quickly ensue thereto, thereby maintaining the pressure therein at the full atmospheric pressure.

The reduction of pressure of the gases within the casing cannot be instantly equalized by ordinary means since the diffusing means will permit only a regulated flow of air therethrough. This sudden reduction in pressure within the casing, while the pressure is maintained at full atmospheric within the diaphragm causes diaphragm 14 to expand thereby erroneously indicating a rate of climb, which in this case would be indicative of descent instead of climb as the pressure inside of the casing 38 is reduced. On instruments as previously provided, this error cannot be compensated for properly when the craft must immediately take flight.

As will now be apparent such errors arise from the difference in pressures within the diaphragm and exterior thereto. The error results from the difference in the atmospheric pressure and the decreased pressure within the casing resulting from the lowered temperature. To offset this error the instrument is so constituted that the carbon within the sealed chamber 57, which has also been subjected to the same temperature changes, possesses the property of adsorption so that in communicating with the interior of the diaphragm the excess gases tending to cause expansion of the diaphragm are taken in or adsorbed by the carbon. Since both the interior of the casing and the chamber 57 are subjected to the lowered temperature the tendency of the diaphragm to expand is offset simultaneously due to the adsorption by the carbon of the excess gases and the pressures interior and exterior of the diaphragm are balanced.

In considering the above example, the converse thereof is also true. For example, when the craft is in flight within low temperatures and is suddenly thrust into warm winds while the altitude remains constant, the casing is subjected to the temperature change. Due to the latter, the specific gravity of the gases within the casing decreases, increasing the molecular velocity and hence the pressure of the gases. The increase in pressure will thus exceed the atmospheric pressure within the diaphragm and tend to contract the latter indicating rate of climb whereas the atmospheric pressure at the exterior of the casing is constant. Simultaneously, with the increase in temperature within the casing, the chamber 57 is subjected to the same temperature change and the increased temperature upon the carbon has the opposite effect to that previously described and causes the carbon to liberate gases into the diaphragm thus offsetting the tendency of the latter to contract.

Figure 4:
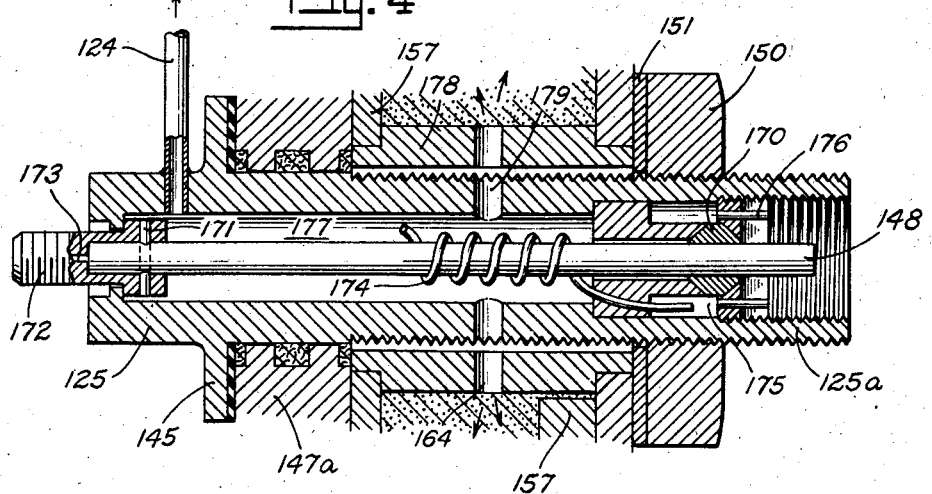
Figure 4 is a fragmentary sectional view of a portion of the instrument of Figure 3.

Reference is now made to Figures 3 and 4 for a second embodiment of the invention wherein parts similar to the parts of Figures 1 and 2 are designated by the same numeral plus 100. The construction and arrangement of parts in this embodiment are similar to the arrangement of Figure 2 and differ mainly only in that another manner of communication between the diaphragm and the carbon chamber is provided together with a variation in the damping constriction between the interior of the diaphragm and the atmosphere.

As will readily appear from Figures 3 and 4 the coupling chamber 125 has its flange 145 secured in any suitable manner to the inwardly extending portion 147a of the casing 138. The coupling chamber 125 is provided with an outwardly extending threaded portion 125a which passes through the casing portion 147a and the carbon chamber 157 and is locked in place by means of a lock nut 150 having an air-tight fit with the interior of the carbon chamber through a gasket 151. A conduit 148 journalled in bearing 170 at one end and secured by means of a pin 171 in a bolt 172 at its other end permits communication of the atmosphere outside of the casing to the interior of the diffuser element 152 by way of a calibrated leak constituted by means of a small longitudinal passage 173 in the supporting bolt 172.

A damping tube 174 surrounds the conduit 148 and communicates with the outside atmosphere by way of chamber 175 and passage 176. (See Figure 4.) The extension 125a of the coupling chamber 125 defines a sealed chamber 177 which communicates with the diaphragm 114 by way of conduit 124. The damping tube 174 may be provided in place of the restriction 24a in tube 24c, disclosed in Figure 2. The effect of either is the same, in that each permits a calibrated leak of the atmosphere to the diaphragm.

Placed within the chamber 157 and surrounding the extended portion 125a of coupling chamber 125 is a bushing 178 having a transverse passage 164 communicating with the interior of chamber 177 by way of the transverse passage 179 in the portion 125a as illustrated in Figure 4.

It will now be apparent that, as above described, when the craft having the instrument mounted thereon passes from a heated hangar to a cold atmosphere, the pressure within the casing will tend to decrease while the pressure within the diaphragm remains unchanged at that time, thereby tending to cause the diaphragm 114 to expand. However, since the chamber 157 is also subjected to this lowered temperature, the carbon being in open communication with the chamber 177 by way of passages 164 and 179 will adsorb air from the chamber 177 and, hence, from the inside of the diaphragm 114, thereby counteracting the tendency of the diaphragm to expand by decreasing the amount of air therein. The damping tube 174 is so designed and the amount of carbon so chosen that upon a decrease in pressure within the casing a corresponding amount of air will be adsorbed by the carbon from chamber 177 and diaphragm 114 so as to offset the erroneous pressure differential created due to the sudden change in temperature. The carbon when subjected to a rise in temperature will liberate a predetermined amount of gas so as to offset the increase in pressure within the casing, due to temperature rise by increasing the pressure within the diaphragm.

Although two embodiments of the invention have been illustrated and described, other changes and modifications in form, materials, and relative arrangement of parts, which will appear to those skilled in the art, may be made without departing from the scope of the invention. Reference is now made to the appended claims for a definition of the limits of the invention.

What is claimed is:

1. In an instrument of the class described, a substantially air-tight casing, a pressure responsive element in said casing and having its interior in partially restricted communication with the atmosphere outside said casing, a diffuser assembly providing restricted communication between the interior of said casing and the atmosphere outside thereof, and air adsorption means communicating with the interior of said pressure responsive element for counteracting the action of said element when the casing is subjected to a sudden temperature change.

2. In a rate of climb indicator, a sealed casing, a pressure responsive element in said casing and having its interior in partially restricted communication with the atmosphere outside of said casing, a diffuser assembly providing restricted communication between the interior of said casing and the atmosphere surrounding said casing, and compensating air adsorption means communicating with said pressure responsive element for opposing contraction and expansion of said element during a sudden temperature change.

3. In a rate of climb indicator, a substantially air-tight casing, a pressure responsive element in said casing and having its interior in partially restricted communication with the atmosphere outside of said casing, means providing restricted communication between the interior of said casing and the atmosphere outside of said casing, and air adsorption means communicating with said pressure responsive element for compensating the latter for sudden pressure change in the interior of said casing due to a change in temperature.

4. In a device of the character described, a pressure responsive element subject to a changing atmospheric pressure on one side thereof, means providing pressure equalization between the pressure on the other side of said element and said changing atmospheric pressure, and means comprising air adsorption means responsive to change of temperature communicating with said first-mentioned side of said pressure responsive element for modifying the action of said pressure responsive element.

5. In an instrument of the class described having a pressure chamber, means comprising flow retarding means providing restricted communication between the outside atmosphere and the interior of said chamber, means responsive to the differential in pressure within said chamber and outside of said chamber, and means including pressure controlling air adsorption means responsive to change in temperature for modifying the action of said differential pressure responsive means.

6. In an instrument of the class described, a substantially air-tight casing, a pressure responsive element within said casing and in partially restricted communication with the atmosphere outside said casing, retarding means providing restricted communication between the inside of said casing and the atmosphere outside thereof, and temperature responsive air adsorption means communicating with said pressure responsive element for modifying the operation of said pressure responsive element during sudden changes of temperature.

7. In an instrument of the class described, a casing, a pressure responsive member within said casing, means providing restricted communication between said casing and the atmosphere outside thereof, indicating means actuated by said pressure responsive member, means providing partially restricted communication between said pressure responsive member and the atmosphere outside said casing, and air adsorption means responding to change of temperature for varying the pressure within said pressure responsive member.

8. In combination, an expansible diaphragm having a yielding wall subject to atmospheric pressure on one side thereof, means for retarding the rate at which pressure on the other side of said yielding wall tends to equalize with a changing atmospheric pressure due to changes in altitude, indicating means actuated by said yielding wall in accordance with the rate of change of altitude, and means comprising air adsorption means responsive to temperature change for producing a compensating effect on said indicating means in accordance with the rate of temperature change so that said indicating means will give true indications irrespective of changes in temperature, said air adsorption means being adapted to vary the pressure on the atmospheric pressure side of said diaphragm.

9. In an instrument of the class described, a substantially air-tight casing, a pressure responsive means mounted in said casing and having one side thereof in partially restricted communication with the atmosphere outside of said casing, retarding means for communicating outside atmosphere to said casing, a chamber adjacent said casing, and air adsorption means contained within said chamber for varying the pressure on said diaphragm as a function of the change of temperature.

10. In a rate of climb indicator, a sealed casing, a pressure responsive element in said casing and being in partially restricted communication with the atmosphere outside of said casing, flow retarding means providing restricted communication between said casing and the atmosphere outside thereof, a chamber adjacent said casing, means providing communication between said chamber and said pressure responsive element, and air adsorption means responsive to change in temperature disposed within said chamber for varying the pressure on the pressure responsive element during a sudden temperature change.

11. In a rate of climb indicator, a sealed casing, a pressure responsive element in said casing and in partially restricted communication with the atmosphere outside of said casing, means retarding the flow of air between the interior and exterior of said casing, a chamber having communication with said pressure responsive element, and non-metallic air adsorbing material in said chamber for varying the pressure on said pressure responsive element during a sudden temperature change.

12. In a rate of climb indicator, a sealed casing, a pressure responsive element in said casing and in partially restricted communication with the atmosphere outside of said casing, means retarding the flow of air between the interior and exterior of said casing, a chamber having communication with said pressure responsive element, and pulverized non-metallic air adsorbing material in said chamber adapted to vary the pressure on said pressure responsive element during sudden temperature change.

13. In a rate of climb indicator, a sealed casing, a pressure responsive element in said casing and in partially restricted communication with the atmosphere outside of said casing, means retarding the flow of air between the interior and exterior of said casing, a chamber having communication with said pressure responsive element, and air adsorption means comprising powdered carbon disposed within said chamber for varying the pressure on said pressure responsive element during sudden temperature change.

14. In a rate of climb indicator, a sealed casing, a pressure responsive element in said casing and having its interior in partially restricted communication with the atmosphere outside of said casing, means retarding the flow of air between the interior and exterior of said casing, a chamber rigidly secured to said casing, conduit means between said chamber and the interior of said pressure responsive element, and air adsorption means within said chamber responsive to change of temperature for adsorbing a quantity of air from said pressure responsive element to offset the change in pressure within said casing due to a sudden temperature change.

15. In an instrument of the class described, a sealed casing, a pressure responsive element in said casing and having its interior in partially restricted communication with the atmosphere outside of said casing, a diffuser assembly providing restricted communication between said casing and the atmosphere outside thereof, a chamber secured to said casing outside thereof, a conduit connecting the interior of said pressure responsive element with said chamber, and air adsorption means comprising powdered carbon in said chamber for compensating the pressure within said pressure responsive element in accordance with the pressure change in said casing due to temperature change.

16. In an instrument of the class described, a sealed casing, a pressure responsive element in said casing, conduit means providing partially restricted communication between the interior of said element and the atmosphere outside of said casing, a diffuser assembly providing restricted communication between said casing and the atmosphere outside thereof, and a chamber containing non-metallic air adsorbing material and communicating with said conduit means for varying the pressure within said pressure responsive means as a function of temperature change.

17. In a rate of climb indicator, a substantially air-tight casing, a pressure responsive element in said casing, a diffuser assembly providing restricted communication between said casing and the atmosphere outside thereof, a chamber outside of said casing, connecting means providing a flow retarding effect between said pressure responsive element and the atmosphere outside of said casing, said chamber surrounding said connecting means and being in communication therewith, and non-metallic air adsorbing material within said chamber for varying the pressure within said connecting means as a function of temperature change.

18. In a rate of climb indicator, a substantially air-tight casing, a pressure responsive element in said casing, a diffuser assembly providing restricted communication between said casing and the atmosphere outside thereof, connecting means providing a flow retarding effect between said pressure responsive element and the atmosphere outside of said casing, a chamber surrounding said connecting means and being in communication therewith, and means comprising powdered carbon within said chamber for varying the pressure within said pressure responsive element as a function of temperature change.

19. In a device of the character described, a casing, a pressure responsive device in said casing and having a yielding wall subject to a changing atmospheric pressure on one side thereof and tending to be actuated by pressures created in said casing due to rapid changes in temperature, means for controlling the rate at which pressure on the other side of said wall tends to become equal to said changing atmospheric pressure, means actuated by said yielding wall in accordance with the rate of change of atmospheric pressure, and means including air adsorption means having communication with one side of said yielding wall and effective upon a rapid change in temperature for preventing the actuation of said yielding wall due to pressure tending to be created in said casing by said rapid change in temperature.

20. In a rate of climb indicator, a casing, a pressure responsive device in said casing and having a yielding wall subject to a changing atmospheric pressure on one side thereof and tending to be actuated by pressures created in said casing due to rapid changes in temperature, means for controlling the rate at which pressure on the other side of said yielding wall tends to become equal to said changing atmospheric pressure, indicating means actuated by said yielding wall in accordance with the rate of change of atmospheric pressure, and means including air adsorption means having communication with one side of said yielding wall and responsive to a rapid change in temperature for preventing the actuation of said yielding wall due to pressure tending to be created in said casing by said rapid change in temperature.

CHRISTOPHER A. RAFFERTY.